(12) United States Patent
Yokomizo

(10) Patent No.: US 10,593,013 B2
(45) Date of Patent: Mar. 17, 2020

(54) IMAGE PROCESSING APPARATUS AND METHOD FOR CONTROLLING THE SAME, IMAGING APPARATUS, AND MONITORING SYSTEM

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/009,316

(22) Filed: Jun. 15, 2018

(65) Prior Publication Data

US 2018/0365799 A1 Dec. 20, 2018

(30) Foreign Application Priority Data

Jun. 20, 2017 (JP) .................................. 2017-120808

(51) Int. Cl.
| | | |
|---|---|---|
| *G06T 3/00* | (2006.01) | |
| *H04N 5/217* | (2011.01) | |
| *H04N 5/357* | (2011.01) | |
| *H04N 5/232* | (2006.01) | |
| *G06T 5/00* | (2006.01) | |

(52) U.S. Cl.
CPC .......... *G06T 3/0062* (2013.01); *G06T 3/0012* (2013.01); *G06T 5/006* (2013.01); *H04N 5/217* (2013.01); *H04N 5/23216* (2013.01); *H04N 5/23238* (2013.01); *H04N 5/232945* (2018.08); *H04N 5/3572* (2013.01); *G06T 2207/30232* (2013.01)

(58) Field of Classification Search
None
See application file for complete search history.

(56) References Cited

U.S. PATENT DOCUMENTS

2012/0288204 A1* 11/2012 Igarashi ............... H04N 19/124
382/195
2015/0016746 A1* 1/2015 Tsubota .................... G06T 3/00
382/275

FOREIGN PATENT DOCUMENTS

| JP | 06-284395 A | 10/1994 |
| JP | 07-203434 A | 8/1995 |
| JP | 2006-101472 A | 4/2006 |

(Continued)

OTHER PUBLICATIONS

The documents cited herein were cited in the Aug. 17, 2018 Japanese Office Action, which is enclosed without an English Translation, that issued in Japanese Patent Application No. 2017120808.

*Primary Examiner* — Christopher Braniff
(74) *Attorney, Agent, or Firm* — Cowan, Liebowitz & Latman P.C.

(57) ABSTRACT

An image processing apparatus obtains a first image, cuts out at least a portion of the first image to generate a second image that is distortion-corrected, receives designation of a first area in which image quality is to be different in the first image, calculates a second area in the second image, the second area corresponding to the first area designated in the first image, and sets, as an area associated with a function that influences encoding processing for encoding the second image, an area that includes the second area and is based on a processing unit of the encoding processing for encoding the second image, the processing unit being an area in the second image.

17 Claims, 15 Drawing Sheets

(56) References Cited

FOREIGN PATENT DOCUMENTS

| JP | 2006-115046 A | 4/2006 |
| JP | 2013-021535 A | 1/2013 |
| JP | 2014-030187 A | 2/2014 |
| JP | 2017-103751 A | 6/2017 |

* cited by examiner

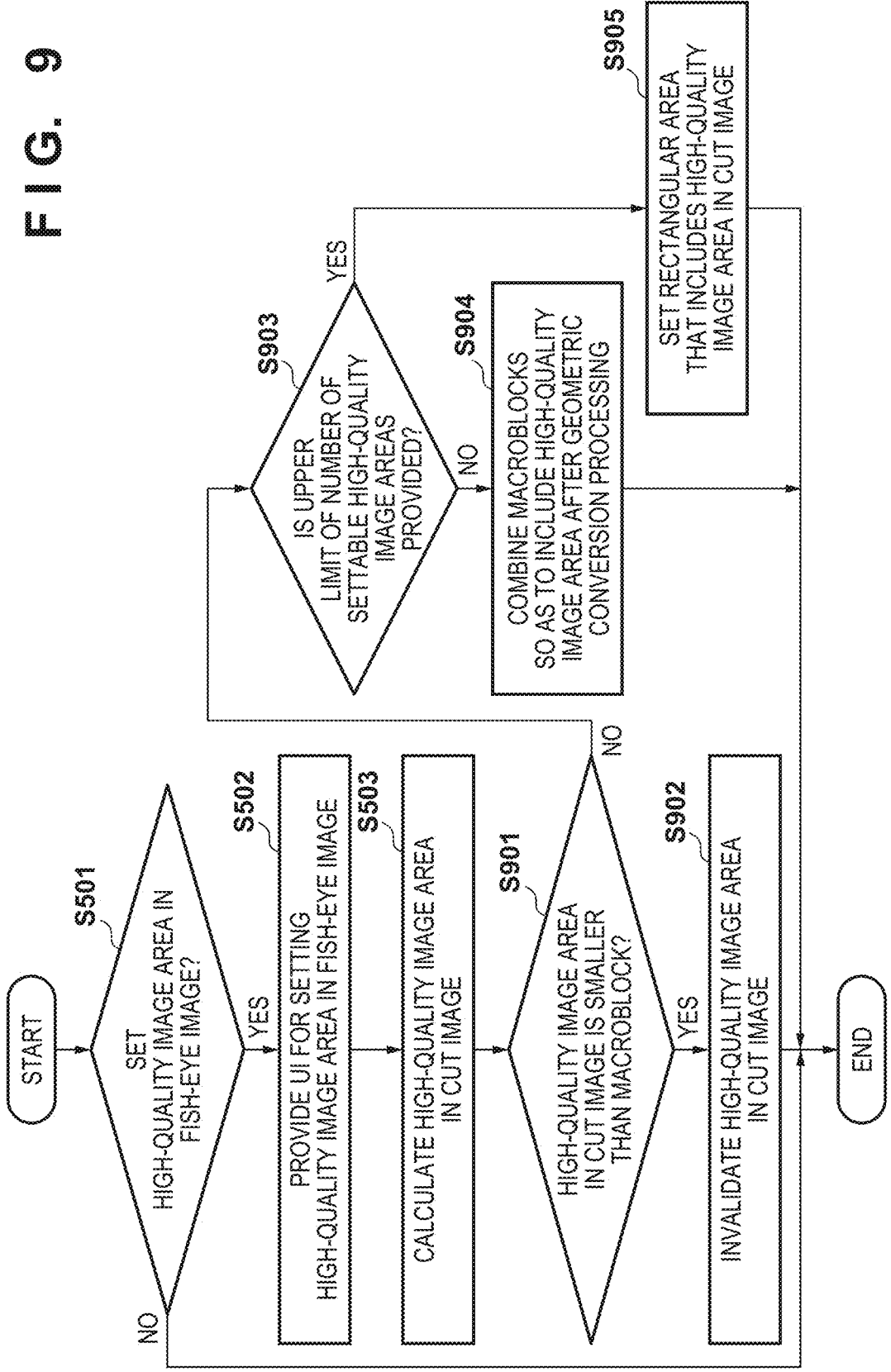

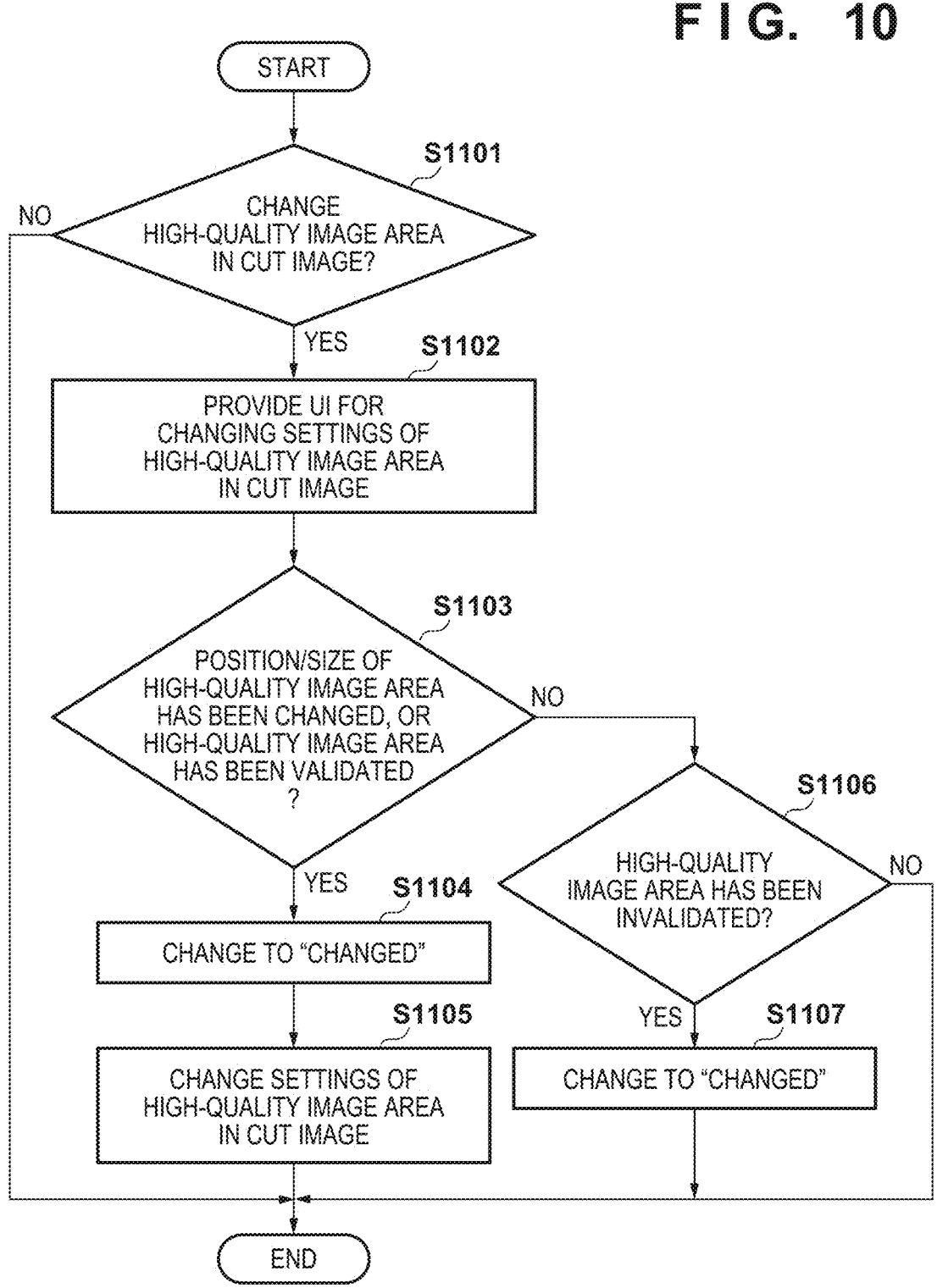

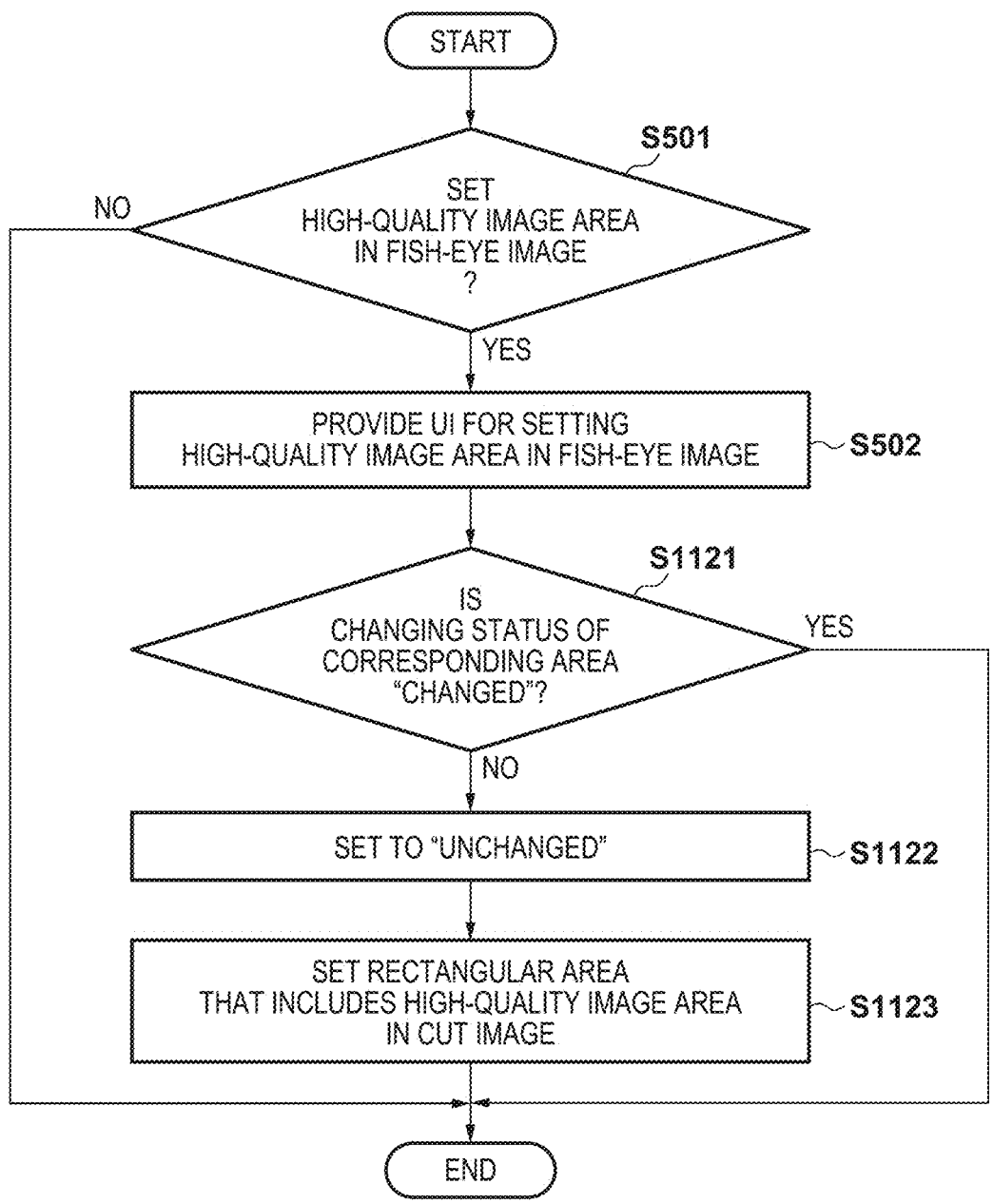

FIG. 12

| HIGH-QUALITY IMAGE AREA | STATUS |
|---|---|
| AREA 1 | CHANGED |
| AREA 2 | UNCHANGED |
| AREA 3 | INVALID |
| AREA 4 | INVALID |
| AREA 5 | INVALID |
| AREA 6 | INVALID |
| AREA 7 | INVALID |
| AREA 8 | INVALID |

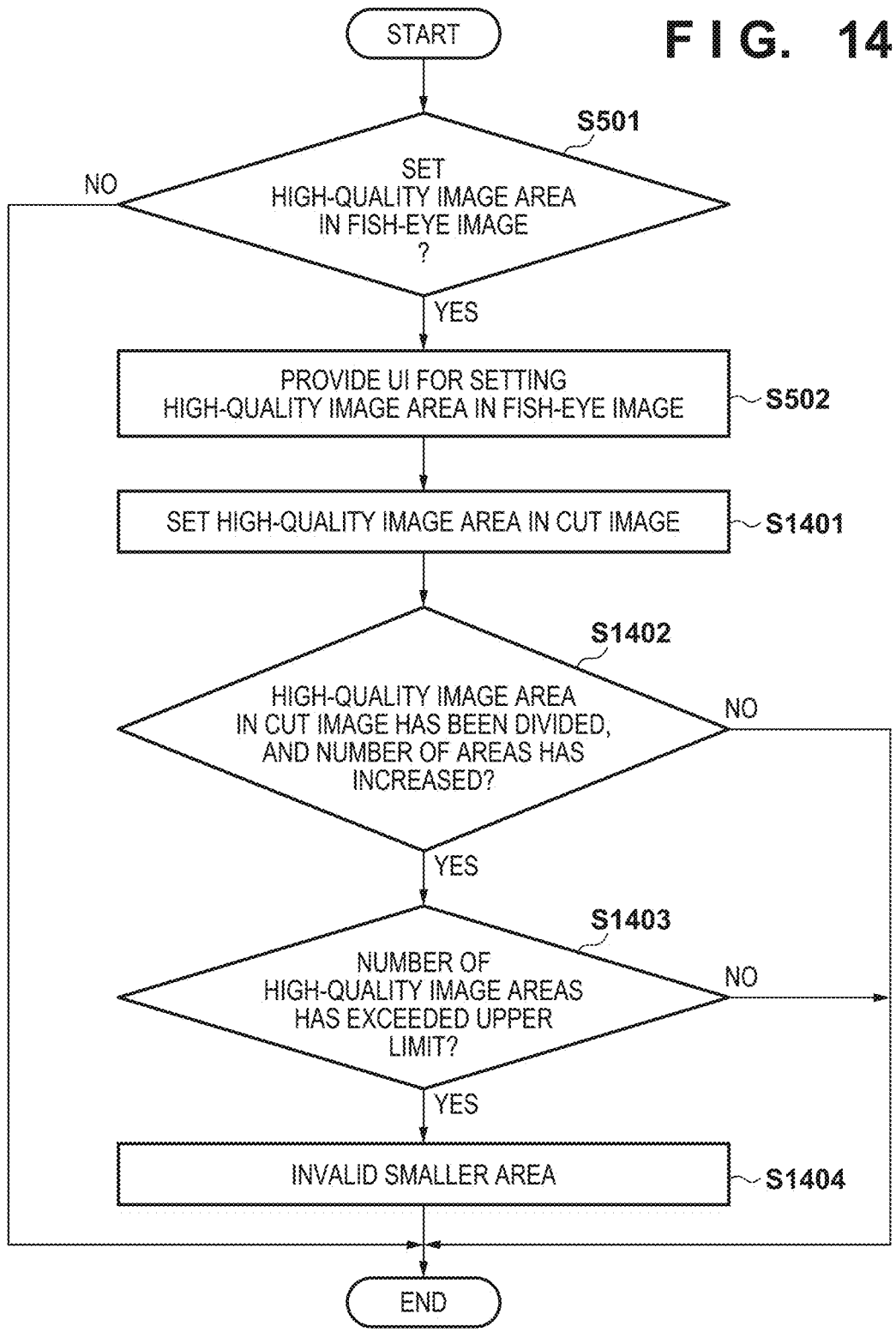

IMAGE PROCESSING APPARATUS AND METHOD FOR CONTROLLING THE SAME, IMAGING APPARATUS, AND MONITORING SYSTEM

BACKGROUND OF THE INVENTION

Field of the Invention

The present invention relates to an image processing apparatus and a method for controlling the same, an imaging apparatus, and a monitoring system.

Description of the Related Art

Omnidirectional cameras in which an omnidirectional mirror or an entire circumference fish-eye lens is mounted are imaging apparatuses that capture images of an entire circumferential (360-degree) view at a time, and are used for various applications such as a monitoring camera and robot navigation. An omnidirectional camera in which an entire circumference fish-eye lens is mounted captures a 360-degree fish-eve image in a ring shape or a circular shape, for example. A captured fish-eye image contains distortion, but a cut image, such as a panoramic image or a planar perspective projection image, can be obtained by cutting out an image from the fish-eye image and performing geometric conversion processing thereon.

Japanese Patent Laid-Open No. 2006-115046 discloses a technique of partially cutting out an image obtained by a wide viewing angle camera, such as an omnidirectional camera, and delivering this cut image. Meanwhile, recently, regarding imaging apparatuses such as a network camera, an imaging apparatus capable of changing image quality in respective areas has been proposed. Japanese Patent Laid-Open No. 06-284395 discloses that the data volume of an image is suppressed while increasing the substantial image quality by increasing the image quality in a screen center portion and reducing the image quality in a peripheral portion.

The MPEG standard is known as a moving image compression and encoding technique. An encoding apparatus that encodes a moving image conforming to the MPEG standard determines a target amount of code for each picture based on a target data rate. Then, based on the target amount of code for each picture, the target amount of code is allocated in an averaged manner to all macroblocks that constitute each picture. Thereafter, the quantization step width for encoding each macroblock is determined so as to achieve the target amount of code, and encoding is performed. If this quantization step width is made smaller, the amount of code increases but a high-quality image can be obtained. Accordingly, for example, in the case of increasing the image quality in an area that is set in an image to be encoded, the quantization step width for macroblocks that constitute this area is made smaller than the quantization step width for macroblocks in the other area. Note that, in the HEVC (High Efficiency Video Coding) standard, the quantization step is determined using a unit called a "coding unit", rather than a macroblock. In any case, in the moving image compression and encoding techniques, the quantization step is determined for each of the rectangular block units, each of which is constituted by a plurality of pixels. Note that, in the moving image compression and encoding techniques, parameters other than the quantization step are also basically determined for each of the rectangular block units.

A case is considered where an area 401, which is to be encoded so as to increase the image quality, is set in a fish-eye image 400, as shown in FIG. 3A. In FIG. 3B, a cut image 450 is an image obtained by cutting out a portion of the fish-eye image 400 that contains distortion, and performing geometric conversion processing to remove the distortion. If the area 401 that is set in the fish-eye image 400 and is to be encoded to have high image quality is expanded in the cut image 450, the area 401 is distorted due to the aforementioned geometric conversion processing and thus becomes an area 451. The area 451 does not have a shape that is based on a macroblock unit, and, in the case of performing encoding for each macroblock as in the MPEG standard, an area that is to be encoded so as to increase the image quality cannot be set in the cut image 450. This point applies not only to the area that is to be encoded so as to increase the image quality, but also to the case of setting an area that is associated with a function that influences the encoding.

SUMMARY OF THE INVENTION

An embodiment of the present invention provides an image processing apparatus in which, if an area associated with a function that influences encoding processing is set in the first image, the area can be appropriately set in a second image that is cut out from a first image and is distortion-corrected, a method for controlling the same, an imaging apparatus, and a monitoring system.

According to one aspect of the present invention, there is provided art image processing apparatus comprising: an obtaining unit configured to obtain a first image; a generating unit configured to cut out at least a portion of the first image to generate a second image that is distortion-corrected; a first reception unit configured to receive designation of a first area in which image quality is to be different in the first image; a calculation unit configured to calculate a second area in the second image, the second area corresponding to the first area designated in the first image; and a setting unit configured to set, as an area associated with a function that influences encoding processing for encoding the second image, an area that includes the second area and is based on a processing unit of the encoding processing for encoding the second image, the processing unit being an area in the second image.

According to another aspect of the present invention, there is provided an imaging apparatus comprising: an imaging unit; an obtaining unit configured to obtain a first image captured by the imaging unit; a generating unit configured to cut out at least a portion of the first image to generate a second image that is distortion-corrected; a first reception unit configured to receive designation of a first area in which image quality is to be different in the first image; a calculation unit configured to calculate a second area in the second image, the second area corresponding to the first area designated in the first image; and a setting unit configured to set, as an area in which image quality is to be different in the second image, an area that includes the second area and is based on a processing unit of encoding processing for encoding the second image, the processing unit being an area in the second image.

According to another aspect of the present invention, there is provided a monitoring system that includes an imaging apparatus, an image processing apparatus, and a client apparatus, the image processing apparatus comprising: an obtaining unit configured to obtain a first image captured by the imaging apparatus; a generating unit configured to cut out at least a portion of the first image to generate a second image that is distortion-corrected; a first reception unit configured to receive, from the client apparatus, designation of a first area in which image quality is to be different in the first image; a calculation unit configured to calculate a second area in the second image, the second area corresponding to the first area designated in the first image; and a setting unit configured to set, as an area associated with a function that influences encoding processing for encoding the second image, an area that includes the second area and is based on a processing unit of the encoding processing for encoding the second image, the processing unit being an area in the second image.

According to another aspect of the present invention, there is provided a method for controlling an image processing apparatus, comprising: obtaining a first image; cutting out at least a portion of the first image to generate a second image that is distortion-corrected; receiving designation of a first area in which image quality is to be different in the first image; calculating a second area in the second image, the second area corresponding to the first area designated in the first image; and setting, as an area associated with a function that influences encoding processing for encoding the second image, an area that includes the second area and is based on a processing unit of the encoding processing for encoding the second image, the processing unit being an area in the second image.

According to another aspect of the present invention, there is provided a non-transitory computer-readable medium storing a program for causing a computer to execute a method for controlling an image processing apparatus, the control method comprising: obtaining a first image; cutting out at least a portion of the first image to generate a second image that is distortion-corrected; receiving designation of a first area in which image quality is to be different in the first image; calculating a second area in the second image, the second area corresponding to the first area designated in the first image; and setting, as an area associated with a function that influences encoding processing for encoding the second image, an area that includes the second area and is based on a processing unit of the encoding processing for encoding the second image, the processing unit being an area in the second image.

Further features of the present invention will become apparent from the following description of exemplary embodiments (with reference to the attached drawings).

BRIEF DESCRIPTION OF THE DRAWINGS

FIG. 9 is a flowchart illustrating processing to set a high-quality image area, according to the second embodiment.

FIG. 10 is a flowchart illustrating processing to set a high-quality image area, according to a third embodiment.

FIG. 11 is a flowchart illustrating processing to set a high-quality image area, according to the third embodiment.

FIG. 12 is a diagram showing a table in which the change status of high-quality image areas in a cut image is registered.

FIG. 14 is a flowchart illustrating processing to set a high-quality image area, according to a fourth embodiment.

DESCRIPTION OF THE EMBODIMENTS

Hereinafter, the embodiments of the present invention will be described in detail based on the drawings.

First Embodiment

Figure 1A:
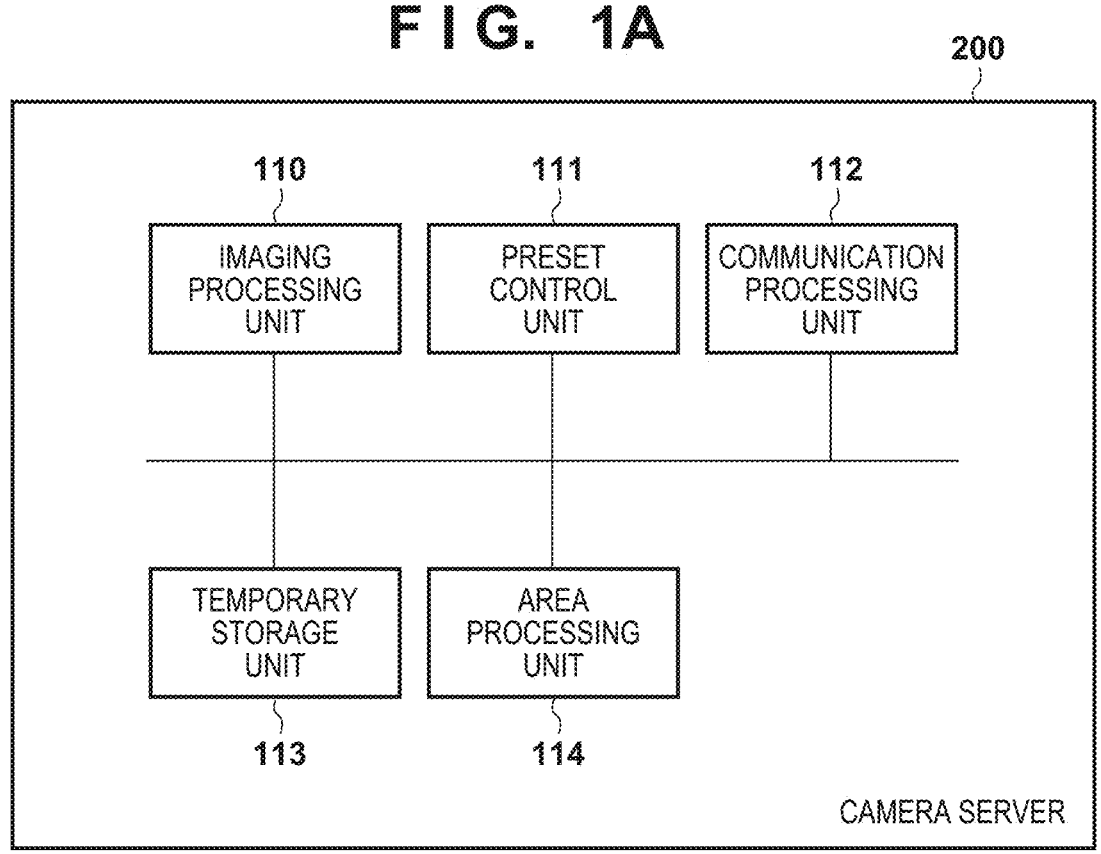
FIG. 1A is a block diagram showing an example of a functional configuration of a camera server according to the embodiments.
Figure 1B:
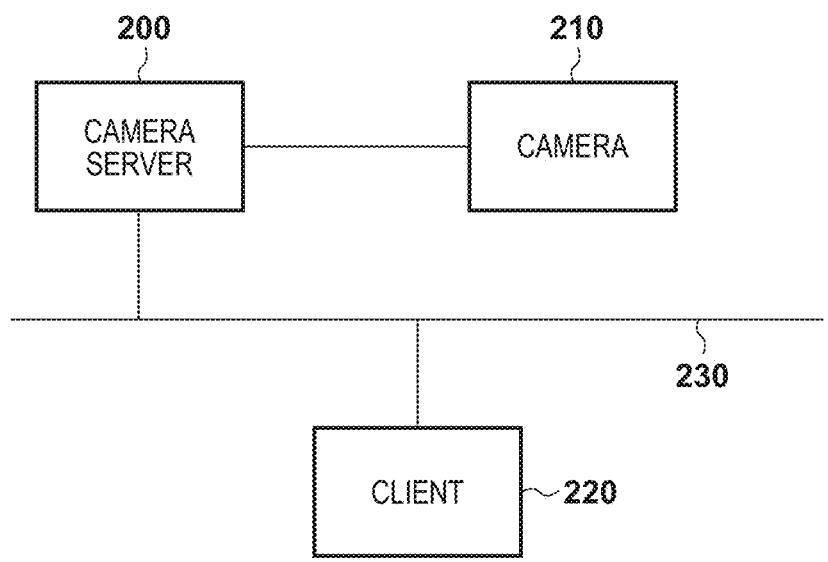
FIG. 1B is a block diagram showing an example of a configuration of a monitoring system according to the embodiments.

FIG. 1B is a diagram showing an example of an apparatus configuration of a monitoring system according to the first embodiment. A camera server 200, which serves as an image processing apparatus, and a client 220 are communicably connected to each other via a network 230. The camera server 200 is connected to a camera 210, the angle of view of which is variable, and delivers an image captured by the camera 210 to an external apparatus via the network 230. The camera 210 is, for example, an omnidirectional camera in which an entire circumference fish-eye lens is mounted. The client 220, which serves as an external apparatus, controls imaging parameters for pan/tilt/zoom, focus, exposure, or the like, while accessing the camera server 200 and obtaining an image. The client 220 also presets these imaging parameters for the camera server 200. The details will be described later. Note that, although a monitoring system that includes one camera server is described for simplification of the description, two or more camera servers may also be provided. A client that is not the client 220 and accesses the camera server 200 to receive and accumulate images may also be provided. Functions of the camera server 200 may also be incorporated in the camera 210.

The network 230 is constituted by a plurality of routers, switches, cables, or the like that conform to a communication standard, such as Ethernet (registered trademark). In this embodiment, any communication standard, scale, or configuration of the network 230 may be employed as long as the server and client can communicate without a problem. Accordingly, various kinds of networks, including the Internet and a LAN (Local Area Network), are applicable to the network 230.

Figure 2:
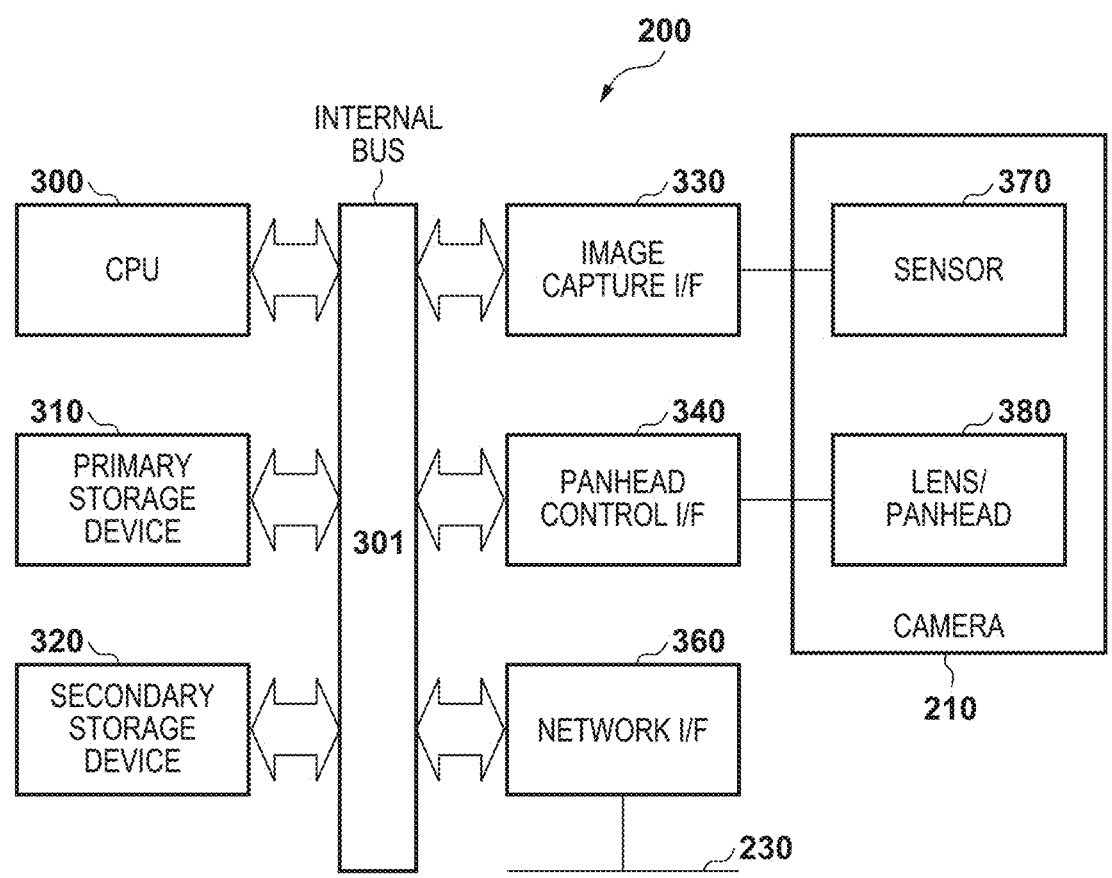
FIG. 2 is a block diagram showing an example of a hardware configuration of the camera server according to the embodiments.
Figure 3A:
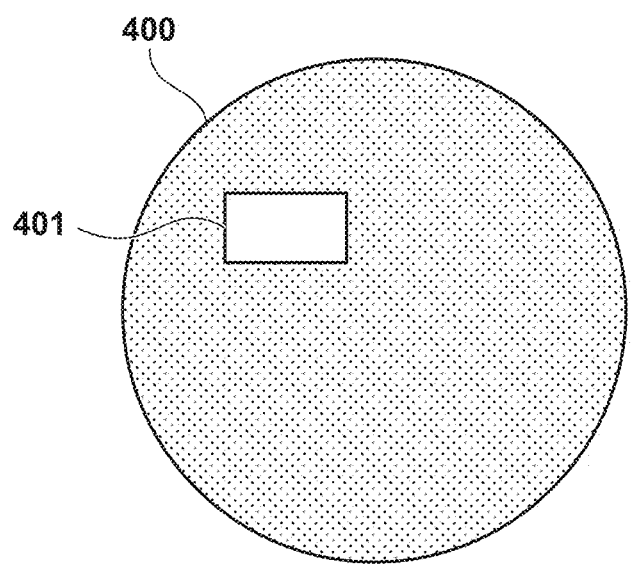
FIGS. 3A and 3B are diagrams showing high-quality image areas in a fish-eye image and a corresponding cut image.
Figure 3B:
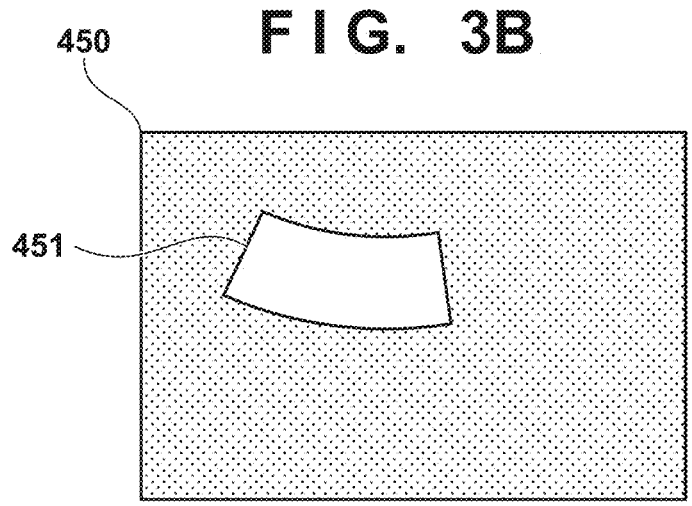

FIG. 2 is a block diagram showing an example of a hardware configuration of the camera server 200. In the camera server 200, a CPU 300, a primary storage device 310, a secondary storage device 320, an image capture I/F 330, a panhead control I/F 340, and a network I/F 360 are connected to one another via an internal bus 301.

The CPU 300 realizes various kinds of control by executing predetermined programs that are loaded to the primary storage device 310. The primary storage device 310 is a high-speed writable storage device, which is typified by a RAM. An OS and various programs that are to be executed by the CPU 300, and various kinds of data are loaded from the secondary storage device 320 to the primary storage device 310. The primary storage device 310 is also used as a work area for the CPU 300 that executes the OS and various programs. The secondary storage device 320 is a nonvolatile storage device, which is typified by an FDD, an HDD, a flash memory, a CD-ROM drive, or the like. The secondary storage device 320 is used as a permanent storage area for storing the OS, various programs, and various kinds of data. The secondary storage device 320 is also used as a storage area for storing various kinds of short-term data. The details of various programs and the like stored in the primary storage device 310 and the secondary storage device 320 in the camera server 200 will be described later.

An image sensor 370 in the camera 210 is connected to the image capture I/F 330. The image sensor 370 is constituted by a CCD sensor or a CMOS sensor. The CPU 300 obtains image data from the image sensor 370 via the image capture I/F 330, performs image processing on the obtained image data in accordance with image quality parameters, converts and compresses the processed image into a predetermined format, and stores the resulting image in the primary storage device 310. The panhead control I/F 340 is connected to a lens/panhead 380 of the camera 210. The CPU 300 controls the pan/tilt/zoom mechanism in the lens/panhead 380 via the panhead control I/F 340 to change the imaging position and the angle of view of the camera 210 (image sensor 370). The network I/F 360 is an I/F for connecting to the network 230, and enables communication with the client 220, for example, via a communication medium such as Ethernet.

FIG. 1A is a block diagram showing an example of a functional configuration of the camera server 200. Functional units shown in FIG. 1A, namely an imaging processing unit 110, a preset control unit 111, a communication processing unit 112, an area processing unit 114, and a temporary storage unit 113 are realized by the CPU 300 executing programs (software) that are loaded to the primary storage device 310. However, the functional units may be realized by dedicated hardware, or may also be realized through cooperation between hardware and software.

The imaging processing unit 110 obtains an image captured by the camera 210 (an image that contains distortion), and cuts out at least a portion of the obtained image to generate a distortion-corrected image. More specifically, the imaging processing unit 110 obtains, via the image capture I/F 330, image data generated by the image sensor 370, and performs image processing and encoding processing in accordance with image quality parameters that are designated by the preset control unit 111. Note that, in this embodiment, an omnidirectional image (fish-eye image) is obtained from the image sensor 370, and the imaging processing unit 110 outputs fish-eye image data, in which the entire fish-eye image is encoded. The imaging processing unit 110 also outputs cut image data, in which an image (cut image) that is obtained by cutting out a portion of a fish-eye image and performing geometric conversion (distortion correction) on this cut-out portion to eliminate or reduce distortion, is encoded. Note that the client 220 may be able to set the cutting position and cutting size of the cut image this embodiment, a fish-eye image is used as an image that contains distortion, but is not limited thereto.

The preset control unit 111 controls the lens/panhead 380 via the panhead control I/F 340 in accordance with imaging parameters such as a preset position, a preset circulation setting, and/or a preset setting of movement according to an event that are set through the client 220. Thus, the pan/tilt/zoom position is controlled in accordance with the preset content. The preset control unit 111 also sets image quality parameters that are saved as preset parameters, for the imaging processing unit 110. The image quality parameters include, for example, parameters for focus, exposure, white balance, day/night, smart shade control, noise reduction, sharpness, color contrast, and the like. The preset parameters may also include information that indicates a cutting range for obtaining a cut image from a fish-eye image.

The communication processing unit 112 sends image data that is saved in the primary storage device 310 to the client 220 via the network I/F 360 and the network 230, in accordance with a request from the client 220. The communication processing unit 112 also informs the preset control unit 111 of imaging parameters (pan/tilt/zoom positions etc.) and image quality parameters that are sent from the client 220. The received preset content is saved in the secondary storage device 320.

The temporary storage unit 113 saves, in the primary storage device 310, image data (fish-eye image data, cut image data) that has been encoded by the imaging processing unit 110. The area processing unit 114 accepts designation of a high-quality image area (an example of an area that is associated with a function that influences encoding processing) that is designated by the client 220 and in which image quality is to be made higher than the image quality in the other area of the same image, and sets the designated high-quality image area for the imaging processing unit 110. The details of the high-quality image area will be described later. For example, the area processing unit 114 sets the step width of the quantization step of macroblocks that constitute the area designated as the high-quality image area in a fish-eye image or a cut image, to be smaller than that in the other area. Thus, in the image data generated by the imaging processing unit 110, the image quality in the high-quality image area is higher than the image quality in the other area. At this time, the high-quality image area is formed in units of macroblocks, as mentioned above. Note that cooperation between the functional units may be realized by using functions provided by the operating system, for example. Note that a macroblock is an example of a processing unit of encoding, but need only be the processing unit of encoding that is defined by a moving image compression/encoding standard that is to be used. The processing unit of encoding is an area in an image, which is defined by a moving image compression/encoding standard that is to be used. The function that influences encoding processing is not limited to the function of changing the image quality in a specific area in an image, but need only be a function with which parameters associated with encoding change.

Figure 4:
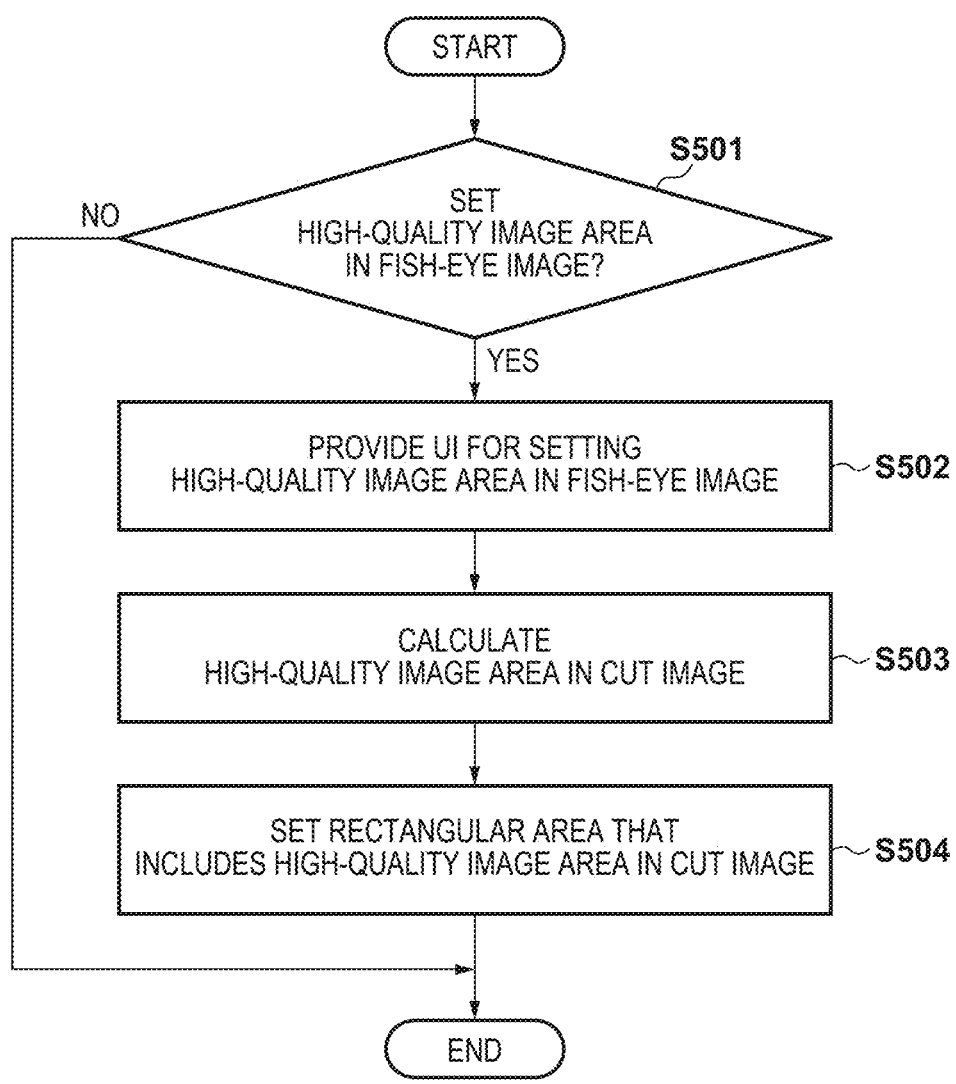
FIG. 4 is a flowchart illustrating processing to set a high-quality image area, according to a first embodiment.
Figure 5:
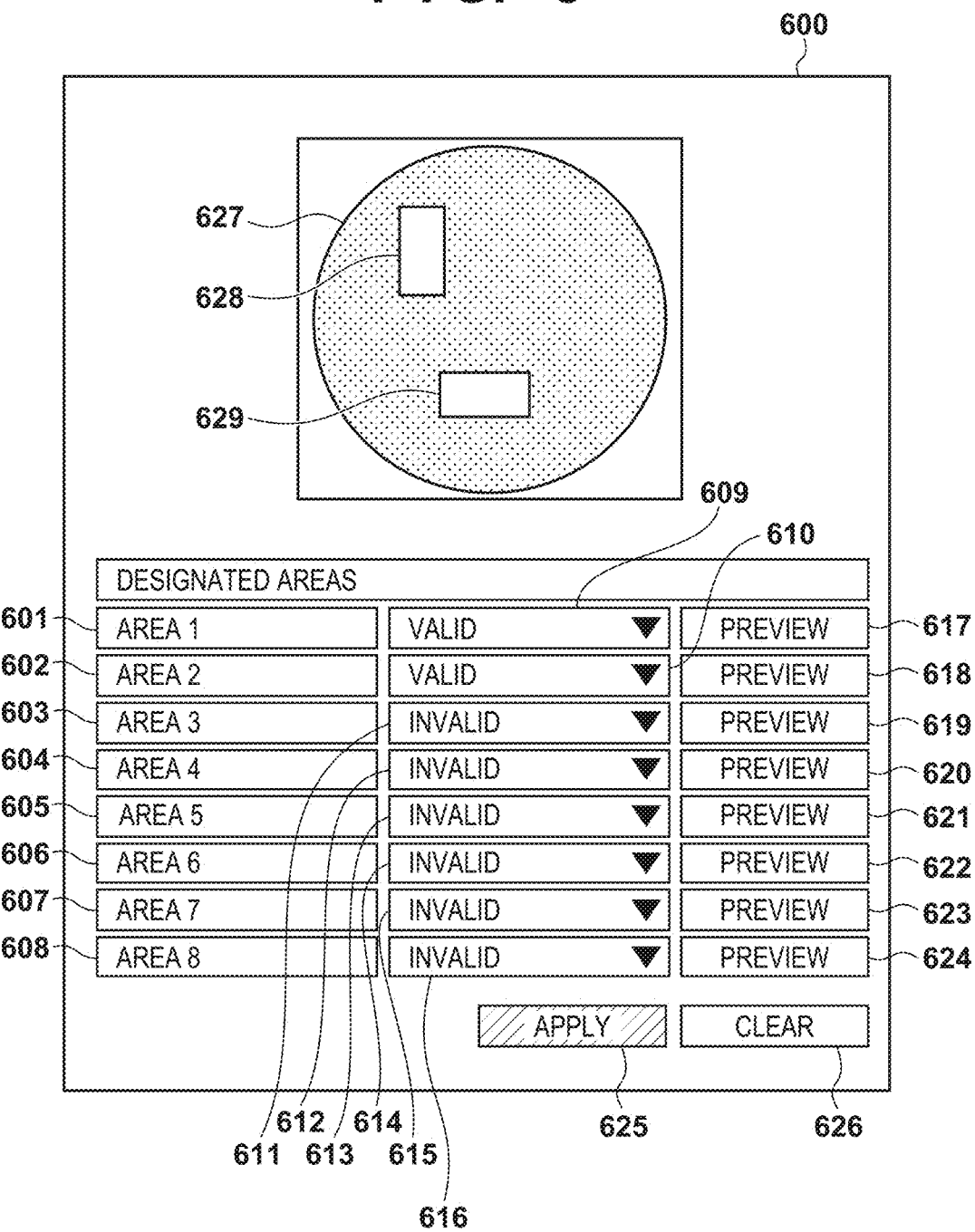
FIG. 5 is a diagram showing an example of a UI screen for setting a high-quality image area in a fish-eye image.
Figure 6:
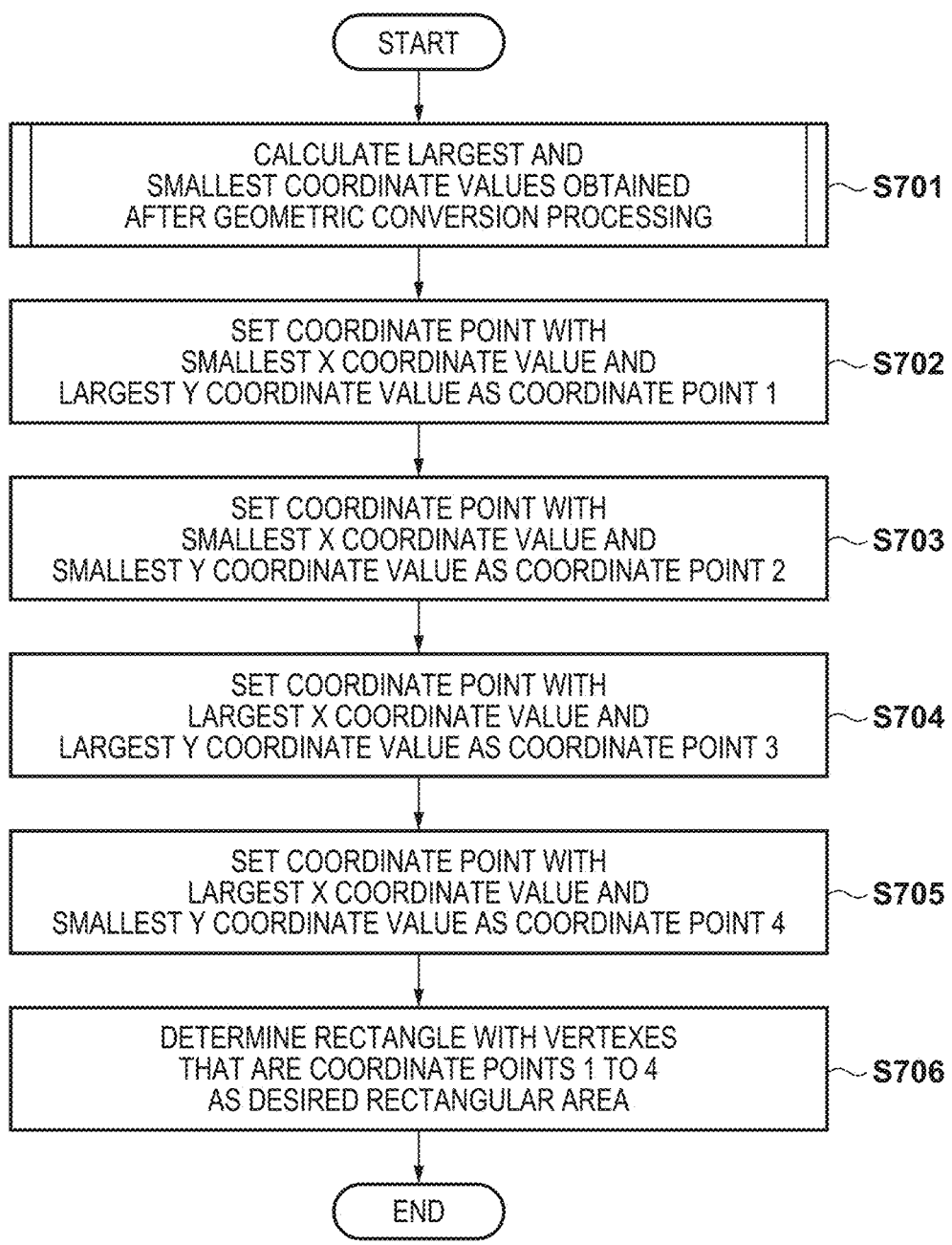
FIG. 6 is a flowchart illustrating processing to derive a rectangular area that includes a deformed high-quality image area.
Figure 7:
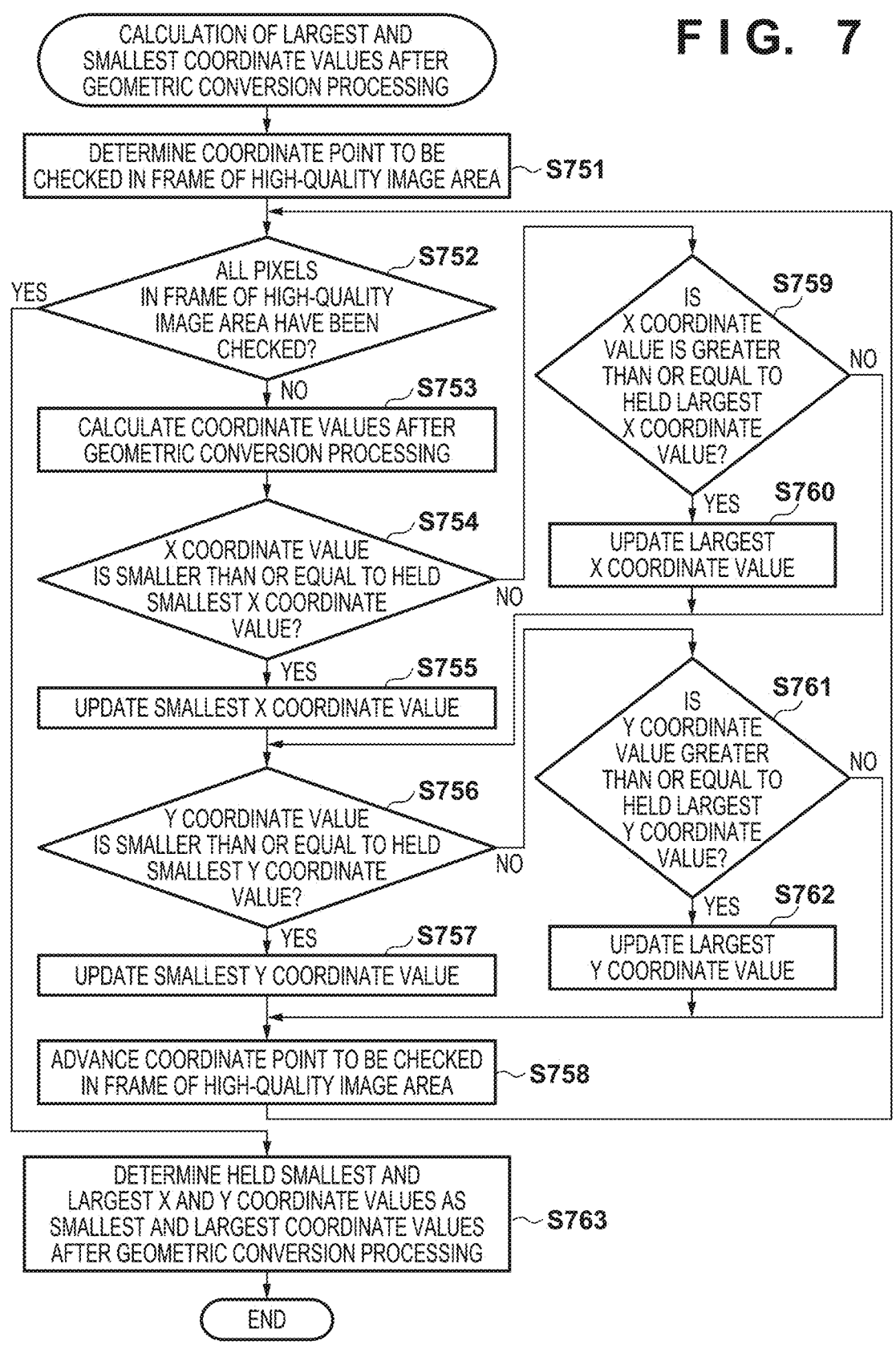
FIG. 7 is a flowchart illustrating processing to derive a rectangular area that includes a deformed high-quality image area.
Figure 8A:
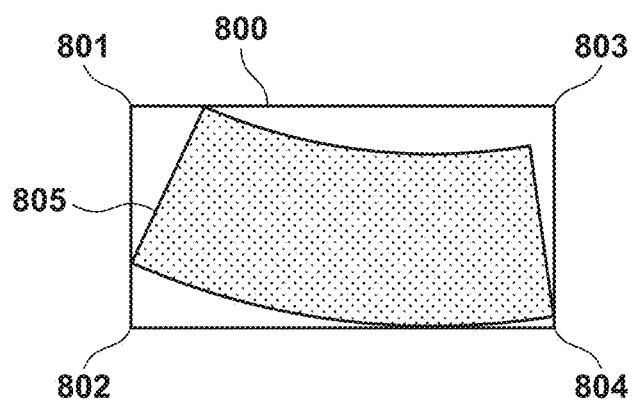
FIG. 8A is a schematic diagram showing a rectangular area that includes a high-quality image area after being subjected to geometric conversion processing, according to the first embodiment.

High-quality image area setting processing according to the first embodiment will be described below with reference to FIGS. 4, 5, 6, 7, and 8A. FIG. 4 is a flowchart illustrating processing performed by the camera server 200 to set a high-quality image area in a fish-eye image and a cut image. Note that the cut image is an image obtained by cutting out at least a portion of a fish-eye image and from which distortion has been reduced or eliminated through geometric conversion processing. FIG. 5 shows an example of a user interface WO screen, which is provided to the client 220 when setting a high-quality image area in a fish-eye image. FIGS. 6 and 7 are flowcharts illustrating processing to derive a rectangular area that includes a high-quality image area that has been deformed due to geometric conversion processing. FIG. 8A is a schematic diagram showing a high-quality image area after being subjected to geometric conversion processing and a rectangular area that includes this high-quality image area.

Note that the reason for setting each area in a rectangular shape is because the processing unit of encoding (macroblock, coding unit etc.) is rectangular. Note that each area may not necessarily be defined by a rectangular shape, and may also be defined by lines parallel to a longitudinal direction or a lateral direction of the image. Also, an area set by the user may also be automatically adjusted so as to fit the processing unit of encoding, Note that, in this embodiment, the camera server 200 provides the UIs to the client 220. For example, a UI for setting a high-quality image area is provided to the client 220 in the form of a web page by the area processing unit 114 in the camera server 200, and is displayed by a browser that operates on the client 220. Needless to say, the provision form of the UIs is not limited thereto, and the UIs may also be realized by executing a dedicated application on the client 220.

A user can give an instruction regarding whether to set a high-quality image area in a fish-eye image by operating a setting screen (not shown) or the like on the client 220, for example. If an instruction to set a high-quality image area in a fish-eye image is given, the camera server 200 is notified of this instruction from the client 220. Upon receiving the instruction to set a high-quality image area in a fish-eye image (YES in S501), the area processing unit 114 provides the client 220 a user interface for setting a high-quality image area in a fish-eye image (S502). Upon receiving the user interface (area setting screen 600 for fish-eye images) from the camera server 200, the client 220 displays the received area setting screen 600 on a display. If the instruction to set a high-quality image area in a fish-eye image is not given (NO in S501), this processing ends.

FIG. 5 is a diagram showing an example of the area setting screen 600 for fish-eve images that is provided by the area processing unit 114 and is displayed on the client 220. A displayed fish-eye image 627 in the area setting screen 600 indicates a fish-eye image captured by the camera 210. A user can set a high-quality image area of the fish-eye image by designating a high-quality image area on this displayed fish-eye image 627. FIG. 5 shows a state where two high-quality image areas 628 and 629 are set to be valid in the image.

In the area setting screen 600 according to this embodiment, up to eight high-quality image areas can be set, and validity and invalidity thereof can be set individually. Note that, needless to say, the number of settable high-quality image areas is not limited to eight. Items 601 to 608 correspond to the high-quality image areas that are set as areas 1 to 8 on a fish-eye image. For example, upon the user selecting the item 601 and designating a rectangle having any size at any position on the displayed fish-eye image 627 using a pointing device, a high-quality image area that corresponds to the area 1 is set. It is assumed in FIG. 5 that the high-quality image area 628 corresponds to the area 1, and the high-quality image area 629 corresponds to the area 2. For example, if the user designates the item 601 (area 1), a frame of the high-quality image area 628 that corresponds thereto is highlighted. If the user selects the high-quality image area 628 on the displayed fish-eye image 627, the corresponding item 601 is highlighted. Thus, the user can comprehend the correspondence between the items 601 to 608 and high-quality image areas on the fish-eye image, The user can set the validity or invalidity of each of the high-quality image areas that are the areas 1 to 8, by using pull-down lists 609 to 616. The user can also display a preview of each high-quality image area using preview buttons 617 to 624. In FIG. 5, the high-quality image area 628, which is the area 1 (601), and the high-quality image area 629, which is the area 2 (602), are valid. The user can also change the position and shape (aspect ratio of the rectangle) of the high-quality image areas 628 and 629 by using a pointing device, for example.

The above set content that is configured on the area setting screen 600 is transmitted from the client 220 to the camera server 200 upon an apply button 625 being pressed, and is saved in the secondary storage device 320 by the area processing unit 114. Upon a clear button 626 being pressed, the set content is restored to the content before being changed. In response to the apply button 625 being pressed, the camera server 200 is notified of the set content (information indicating the position and size of each high-quality image area in the fish-eye image) in the area setting screen 600. Upon receiving the notification regarding the set content, the area processing unit 114 calculates an area in the cut image that corresponds to each high-quality image area in the fish-eye image, by means of geometric conversion processing (S503).

The area processing unit 114 determines, in the cut image, a rectangular area that includes the area corresponding to the high-quality image area set in the fish-eve image (i.e. the area calculated in step S503), and sets the determined rectangular area as a high-quality image area in the cut image (S504). Strictly speaking, the high-quality image area is a set of macroblocks that includes the rectangular area calculated in step S503. Since, as mentioned above, the cut image is an image obtained by performing geometric conversion processing on the fish-eye image, a rectangular high-quality image area set in the fish-eve image is deformed due to this geometric conversion processing. The area processing unit 114 sets a rectangular area that circumscribes the deformed high-quality image area in the cut image. FIG. 8A shows the setting of this rectangular area. 805 in FIG. 8A denotes a high-quality image area after being subjected to geometric conversion processing. 800 denotes a rectangular area that includes the high-quality image area 805. 801 to 804 denote coordinates of vertexes of the rectangular area 800. The rectangular area 800 circumscribes the area (high-quality image area 805) calculated in step S503, and the sides thereof are defined by a rectangle that is parallel to the horizontal direction or the vertical direction of the cut image.

Processing to set a rectangular area that circumscribes a high-quality image area in a cut image will be described below using the flowcharts in FIGS. 6 and 7. Initially, the area processing unit 114 calculates the largest coordinate values and the smallest coordinate values of the high-quality image area 805 after being subjected to geometric conversion processing (S701). Here, the coordinates refer to coordinates along X and Y axes of the cut image. The details of step S701 are illustrated in the flowchart in FIG. 7.

After the largest coordinate values and the smallest coordinate values of the high-quality image area 805 after being subjected to geometric conversion processing are calculated, the area processing unit 114 sets the coordinate point defined by the smallest X coordinate value and the largest Y coordinate value as a coordinate point 1 (S702). The coordinate point 1 corresponds to a coordinate point 801. Subsequently, the area processing unit 114 sets the coordinate point defined by the smallest X coordinate value and the smallest Y coordinate value as a coordinate point 2 (S703). The coordinate point 2 corresponds to a coordinate point 802. Next, the area processing unit 114 sets the coordinate point defined by the largest X coordinate value and the largest Y coordinate value as a coordinate point 3 (S704). The coordinate point 3 corresponds to a coordinate point 803. Next, the area processing unit 114 sets the coordinate point defined by the largest X coordinate value and the smallest Y coordinate value as a coordinate point 4 (S705). The coordinate point 4 corresponds to a coordinate point 804. The area processing unit 114 then determines the rectangle with vertexes that are the coordinate point 1 (801), coordinate point 2 (802), coordinate point 3 (803), and coordinate point 4 (804), as the rectangular area 800 (S706).

Next, a description will be given, using FIG. 7, of processing performed in step S701 to calculate the largest coordinate values and the smallest coordinate values of the high-quality image area 805 after being subjected to geometric conversion processing.

Initially, the area processing unit 114 secures, in the primary storage device 310, an area for holding the smallest X coordinate value, the smallest Y coordinate value, the largest X coordinate value, and the largest Y coordinate value. The values are not held in this area when secured. Next, the area processing unit 114 chooses any one coordinate point in the frame of a high-quality image area 629 (hereinafter, simply "frame") and sets this coordinate point as the coordinate point to be checked (S751).

Next, the area processing unit 114 determines whether or not all coordinate points of the pixels that constitute the frame have been checked (S752). If all coordinate points of the pixels that constitute the frame have been checked (YES in S752), the held smallest X coordinate value, smallest Y coordinate value, largest X coordinate value, and largest X coordinate value are determined as the largest coordinate values and the smallest coordinate values after geometric conversion processing (S763). If there are unchecked pixels that constitute the frame (NO in S752), the area processing unit 114 calculates the coordinate values obtained as a result of performing geometric conversion processing on the high-quality image area 629 (S753). Here, if values are not set in the area for holding the smallest X coordinate value, the smallest Y coordinate value, the largest X coordinate value, and the largest Y coordinate value, the calculated coordinate values are set therein.

Subsequently, the area processing unit 114 determines whether or not the X coordinate value calculated in step S753 is smaller than or equal to the smallest X coordinate value (S754). If the X coordinate value calculated in step S753 is smaller than or equal to the held smallest X coordinate value (YES in S754), the smallest X coordinate value is replaced with the calculated coordinate value (S755). If the X coordinate value calculated in step S753 is greater than the held smallest X coordinate value (NO in S754), the area processing unit 114 determines whether or not the X coordinate value calculated in step S753 is greater than or equal to the held largest X coordinate value (S759). If the X coordinate value calculated in step S753 is greater than or equal to the held largest X coordinate value (YES in S759), the largest X coordinate value is replaced with the calculated coordinate value (S760).

Subsequently, the area processing unit 114 determines whether or not the Y coordinate value calculated in step S753 is smaller than or equal to the held smallest Y coordinate value (S756). If the Y coordinate value calculated in step S753 is smaller than or equal to the held smallest Y coordinate value (YES in S756), the smallest Y coordinate value is replaced with the calculated coordinate value (S757). If the Y coordinate value calculated in step S753 is greater than the held smallest Y coordinate value (NO in S756), the area processing unit 114 determines whether or not the Y coordinate value calculated in step S753 is greater than or equal to the held largest Y coordinate value (S761). If the Y coordinate value calculated in step S753 is greater than or equal to the held largest Y coordinate value (YES in S761), the largest Y coordinate value is replaced with the calculated coordinate value (S762).

After the above processing ends, the area processing unit 114 selects the next coordinates on the frame of the high-quality image area 629 (S758), and returns the processing to step S752. By repeating the processing in steps S752 to S762, the smallest X coordinate value, the smallest Y coordinate value, the largest X coordinate value, and the largest Y coordinate value of the high-quality image area after being subjected to geometric conversion processing can be calculated.

Thus, an area that has a shape based on the processing unit of encoding processing and approximates to the high-quality image area 805 can be set by setting a rectangular high-quality image area with respect to the rectangular area 800 that includes the high-quality image area 805 subjected to geometric conversion processing. Accordingly, upon the user setting a high-quality image area in a displayed fish-eye image 627, a high-quality image area can be set at a position close to the position intended by the user, without the user setting the area in the cut image again.

Second Embodiment

Figure 8B:
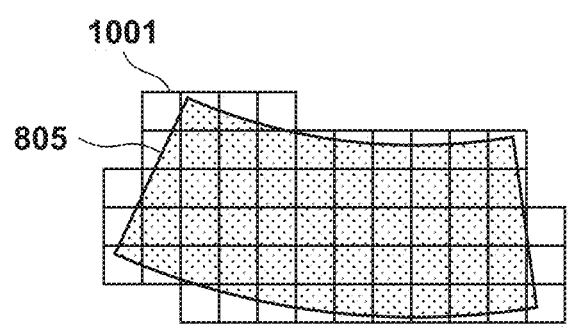
FIG. 8B is a schematic diagram of an area constituted by a set of macroblocks that includes a high-quality image area after being subjected to geometric conversion processing, according to a second embodiment.

The first embodiment has described processing to set a high-quality image area in a cut image, using a rectangle that circumscribes an area in the cut image that corresponds to a rectangular high-quality image area set in a fish-eye image. The second embodiment will describe a configuration in which macroblocks (an example of a processing unit in encoding processing) that cover an area in a cut image are set as a high-quality image area (an example of an area associated with a function that influences encoding processing). High-quality image area setting processing performed by the area processing unit 114 according to the second embodiment will be described below with reference to FIGS. 9 and 8B. FIG. 9 is a flowchart illustrating processing to set a high-quality image area in a fish-eye image and a cut image. FIG. 8B is a schematic diagram of a high-quality image area after being subjected to geometric conversion processing and an area formed by macroblocks that are combined so as to include the high-quality image area.

In FIG. 9, steps S501 to S503 are as described in the first embodiment (FIG. 4). The area processing unit 114 determines whether or not the size of the area (the area calculated in step S503) in the cut image that corresponds to the high-quality image area set in the fish-eye image is smaller than the size of one macroblock (S901). If the size of the area is smaller than the size of one macroblock (YES in S901), the area processing unit 114 determines that there is no valid high-quality image area, and invalidates the setting of the high-quality image area in the cut image (S902).

If the size of the area in the cut image is greater than or equal to the size of one macroblock (NO in S901), the area processing unit 114 determines whether or not the upper limit of the number of settable high-quality image areas is provided in the specifications of the imaging processing unit 110 (S903). If the upper limit of the number of settable high-quality image areas is not provided (NO in S903), the area processing unit 114 regards a set of macroblocks each including a portion of the high-quality image area as a high-quality image area (S904). For example, a set of macroblocks 1001 that are arranged to include the high-quality image area 805 subjected to geometric conversion processing, as shown in FIG. 8B, is regarded as a high-quality image area in the cut image. In this case, the macroblocks that constitute the set is set as a high-quality image area in the cut image (S904). Thus, a high-quality image area can be set at a position that is closer to the position intended by the user. On the other hand, if the upper limit of the number of settable high-quality image areas is provided (YES in S903), the area processing unit 114 sets, in the cut image, a rectangular area that includes the high-quality image area 805 that has been deformed due to geometric conversion processing (S905). The rectangular area that includes the high-quality image area 805 is as described in the first embodiment.

As described above, according to the second embodiment, an area can be set to a position that is closer to the position intended by the user while conforming to the specifications of the apparatus, by changing the high-quality image area in a cut image in accordance with various kinds of limitations. Note that, in step S903, it is determined, based on the provision of the upper limit in the specifications, whether to use a set of macroblocks that covers the high-quality image area 805 (FIG. 8B) or a rectangle that includes the high-quality image area 805 (FIG. 8A), but the present invention is not limited thereto. For example, a configuration may also be employed in which a set of macroblocks 1001 such as that shown in FIG. 8B is used if the number of macroblocks each including a portion of the high-quality image area 805 is smaller than a predetermined number, and the rectangular area 800 such as one shown in FIG. 8A is used if the number of macroblocks each including a portion of the high-quality image area 805 is greater than or equal to the predetermined number.

Third Embodiment

The first and second embodiments have described a configuration in which, if any high-quality image area is set in a fish-eve image, a corresponding high-quality image area is set in a cut image. The third embodiment will describe a configuration that enables changes to be made regarding a high-quality image area in a cut image that is set based on settings of a high-quality image area (an example of an area associated with a function that influences encoding processing) in a fish-eye image. High-quality image area setting processing according to the third embodiment will he described below with reference to FIGS. 10, 11, 12, and 13.

Figure 13:
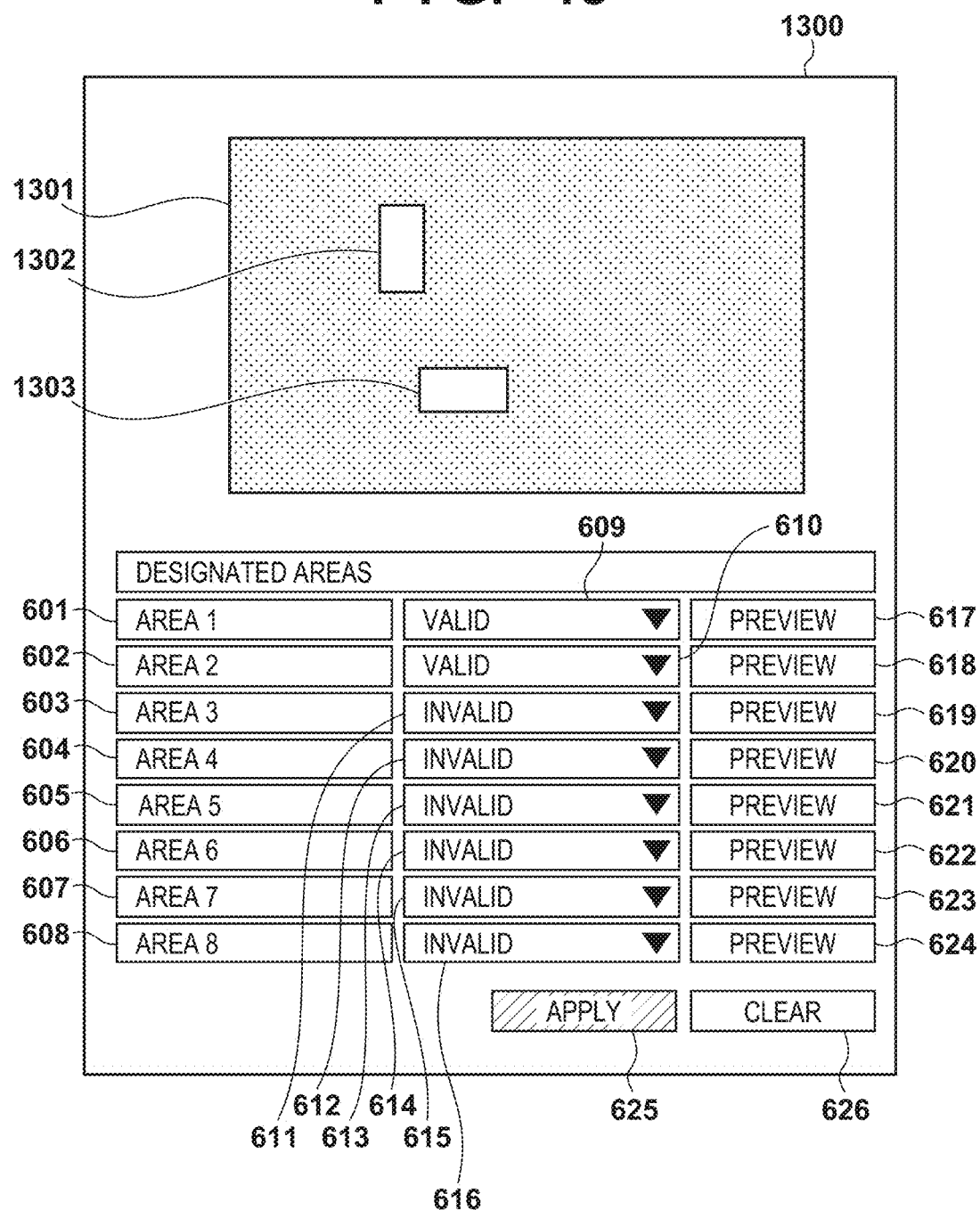
FIG. 13 is a diagram showing an example of a UI screen for setting a high-quality image area in a cut image.

FIG. 10 is a flowchart illustrating processing by which a user manually changes settings of a high-quality image area in a cut image. FIG. 11 is a flowchart illustrating processing to set a high-quality image area in a cut image when the user sets a high-quality image area in a fish-eye image. FIG. 12 shows an example of a data configuration of a table that indicates whether the user has changed settings of each high-quality image area in a cut image. FIG. 13 shows an example of a UI screen, which is provided to the client 220 when setting a high-quality image area in a cut image.

In FIG. 10, the user can give an instruction regarding whether to change settings of a high-quality image area in a cut image, by operating a setting screen (not shown) or the like on the client 220, for example (S1101). If an instruction to change the settings of a high-quality image area in a cut image is given (YES in S1101), the area processing unit 114 provides the client 220 with a user interface for changing the high-quality image area in the cut image (S1102). Upon receiving this user interface (area setting screen 1300 for cut images; FIG. 13), the client 220 displays the received user interface on a display.

The area setting screen 1300 for cut images will now be described with reference to FIG. 13. In FIG. 13, display items that have the same functions as those in the user interface shown in FIG. 5 are assigned the same reference numerals. FIG. 13 shows a state where high-quality image areas 1302 and 1303 are set in the cut image, which is displayed as a displayed cut image 1301.

items 601 to 608 correspond to high-quality image areas that are set as areas 1 to 8 in the cut image, in FIG. 13, the high-quality image area 1302, which serves as the area 1, and the high-quality image area 1303, which serves as the area 2, are valid in the cut image. Note that the high-quality image areas 1302 and 1303 are areas that are set in the cut image corresponding to high-quality image areas that are set in a fish-eye image. As with the area setting screen 600 for fish-eye images according to the first embodiment, the user can change the position and shape of the high-quality image areas 1302 and 1303. If an apply button 625 is pressed, the client 220 notifies the camera server 200 of the set content, which is then saved in the secondary storage device 320. If a clear button 626 is pressed, these settings are restored to those before being changed.

The area processing unit 114 updates the change status of each high-quality image area held in a table 1200 (FIG. 12), based on the set content of which the camera server 200 is notified by the client 220 (S1103 to S1104, S1106 to S1107). An example of a data configuration of the table 1200 in FIG. 12 will now be described. The change status of the areas 1 to 8 is held in the table 1200. The change status refers to a status regarding whether the settings of each high-quality image area that is set in a cut image are unchanged from the settings derived from a high-quality image area set in a fish-eye image, or have been changed through the client 220 by the user. "Changed" indicates that the settings of a high-quality image area have been changed by the user (e.g. by using a UI shown in FIG. 13 on the client 220). "Unchanged" indicates that the settings of a high-quality image area in the cut image have not been changed from the settings derived from a high-quality image area designated in a fish-eye image. "Invalid" indicates that a high-quality image area in the cut image is invalid. The table 1200 indicates that the settings of the area 1 (high-quality image area 1302 in the cut image) have been changed by the user, the settings of the area 2 (high-quality image area 1303 in the cut image) have not been changed, and the other areas are invalid. The content of the table 1200 is saved in the primary storage device 310. Note that, when the camera server 200 is started (including when the camera server 200 is restarted), the area processing unit 114 initializes the change status of each area set in the table 1200 to "unchanged".

If the camera server 200 is notified of the fact that the user has changed the position and/or size of a high-quality image area, or the user has switched "invalid" to "valid" on the pull-down list(YES in S1103), the area processing unit 114 changes the corresponding area in the table 1200 to "changed" (S1104). Subsequently, the area processing unit 114 changes the settings of the high-quality image area in the cut image based on the content set by the user (content of which the camera server 200 has been notified) (S1105). On the other hand, if the camera server 200 is notified of the fact that a high-quality image area in the cut image has been changed from a valid state to an invalid state (NO in S1103 and YES in S1106), the area processing unit 114 changes the status of the corresponding area in the table 1200 to "invalid" (S1107). If no change has been made to the high-quality image areas in the cut image (NO in S1103 and NO in S1106), the table 1200 is not updated, and the processing ends as-is.

Next, a description will be given of processing to set a high-quality image area in a fish-eye image and processing to reflect the high-quality image area in a cut image according to the third embodiment, with reference to the flowchart in FIG. 11. Processing in steps S501 and S502 is the same as that in the first embodiment (FIG. 4). Upon the camera server 200 being notified of the content of settings of a high-quality image area by the client 220 in response to the apply button 625 being pressed, the area processing unit 114 references the table 1200 and checks the change status of an area that corresponds to the high-quality image area set in the fish-eye image (S1121).

If, in the table 1200, the change status of the high-quality image area that has been set or changed in the fish-eye image is "changed" (YES in S1121), the processing ends. That is to say, in this case, the area processing unit 114 determines that the user has intentionally changed the settings of the high-quality image area in the cut image, and does not set or change the high-quality image area in the cut image. On the other hand, if the change status is a status other than "changed" (NO in S1121), the area processing unit 114 changes the change status of the corresponding area in the table 1200 to "unchanged" (S1122). Subsequently, the area processing unit 114 sets, in the cut image, a rectangular area 800 that includes the high-quality image area 805 that has been deformed due to geometric conversion processing (S1123). Note that processing in step S1123 is the same as that in steps S503 and S504 in the first embodiment (FIG. 4). However, step S504 may also be replaced with processing (S901 to S905) described in the second embodiment (FIG. 9).

As described above, according to the third embodiment, in the case where the user has changed the settings of a high-quality image area in a cut image, even if the settings of the corresponding high-quality image area in a fish-eye image are changed, this change is not reflected in the high-quality image area in the cut image. Accordingly, the change in the settings of the high-quality image area in the fish-eye image can be reflected in the high-quality image area in the cut image without impairing the intention of the user.

Note that, although the third embodiment has described the case of applying a change made to the settings of a high-quality image area in a fish-eye image to a change in the settings of a high-quality image area in a cut image, the same also applies to the opposite case. That is to say, the same also applies to the case of applying a change made to the settings of a high-quality image area in a cut image to a change in settings of a high-quality image area in a fish-eye image.

Fourth Embodiment

Next, a description will be given of the setting of a high-quality image area in the case where a plurality of portions of a fish-eye image are cut out to generate a plurality of cut images. The following description will take, as an example, the case of delivering a video while handling four cut images that are arranged together as one image (hereinafter, "four-section cut image"). In the fourth embodiment, if a high-quality image area (an example of an area associated with a function that influences encoding processing) is divided, and the thus-divided high-quality image areas are located separately in a plurality of cut images, the smaller area is excluded from the areas to increase image quality. A high-quality image area setting flow according to the fourth embodiment of the present invention will be described below with reference to FIGS. 14, 15A, and 15B.

Figure 15A:
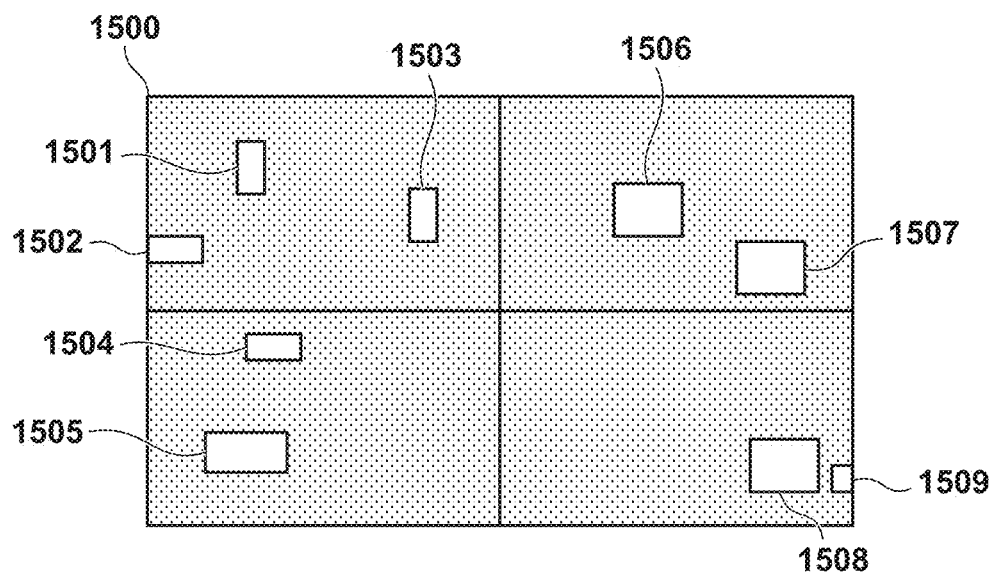
FIGS. 15A and 15B are diagrams illustrating a four-section cut image and high-quality image areas.

FIG. 14 is a flowchart for setting high-quality image areas in a fish-eye image and a cut image. FIG. 15A is a schematic diagram showing a four-section cut image 1500 and high-quality image areas 1501 to 1509. Processing in steps S501 and S502 in FIG. 14 is the same as that in the first embodiment (FIG. 4). The area processing unit 114 arranges, on the four-section cut image, the area of which the camera server 200 has been notified by the client 220 and that corresponds to the high-quality image area set in the fish-eye image (S1401). At this time, a rectangle that circumscribes the area that has been deformed from a rectangular shape due to geometric conversion processing is set as a high-quality image area in the cut image, as described in the first embodiment.

Figure 15B:
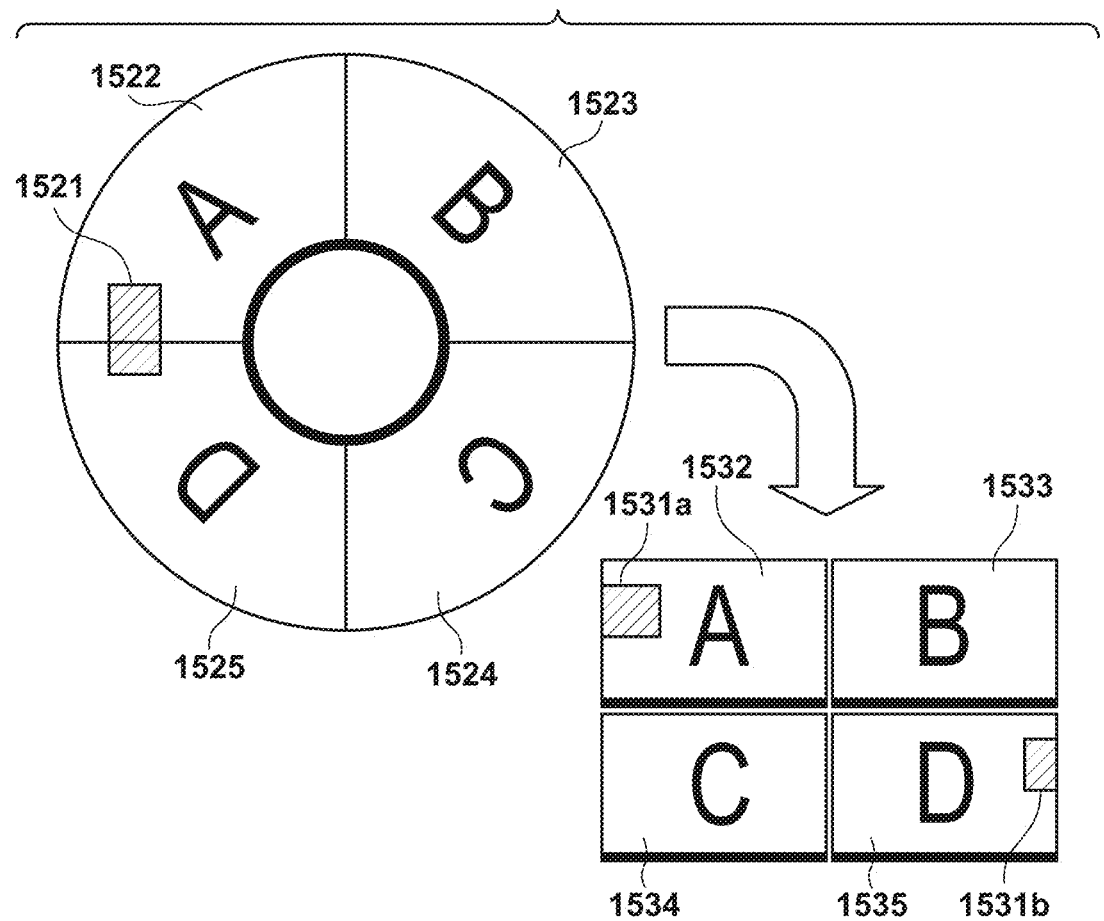

Next, the area processing unit 114 determines whether or not the number of areas in the cut image has increased and become greater than the number of high-quality image areas in the fish-eye image, as a result of the high-quality image area in the cut image having been divided (S1402). For example, as shown in FIG. 15B, the four-section cut image is constituted by four cut images 1532 to 1535, which are obtained by performing geometric conversion processing on four areas 1522 to 1525 that are cut out in a ring shape from the fish-eye image. The lower sides of the cut images correspond to the inner circumference of the fish-eye image (which is indicated by a thick line in FIG. 15B). In the case where the cut images 1532 to 1535 are arranged in the four-section cut image as shown in the diagram, a high-quality image area 1521 that is set in the fish-eye image is divided into a high-quality image area 1531a and a high-quality image area 1531b in the four-section cut image. As a result, the number of high-quality image areas increases. As an example of the above-described state, a high-quality image area 1502 in the upper left area and a high-quality image area 1509 in the lower right area in the four-section cut image 1500 in FIG. 15A are areas that were originally set as one high-quality image area in the fish-eye image.

As mentioned above, the area processing unit 114 determines whether or not the number of high-quality image areas set in the four-section cut image has increased from the number of high-quality image areas set in the fish-eye image. If it is determined that the number of high-quality image areas in the four-section cut image has increased (YES in S1402), the area processing unit 114 determines whether or not the number of high-quality image areas exceeds the upper limit of the number of settable high-quality image areas in the specifications of the imaging processing unit 110 (S1403). If the number of high-quality image areas exceeds the upper limit (YES in S1403), the area processing unit 114 invalidates the smaller one of the divided high-quality image areas (in FIG. 15A, high-quality image area 1509) (S1404).

As described above, according to the fourth embodiment, even if the number of high-quality image areas exceeds the upper limit in a four-section cut image, the high-quality image areas can be set without impairing the intention of the user as much as possible. Although, in FIG. 14, the number of settable high-quality image areas is prevented from being exceeded by invalidating a smaller area, the present invention is not limited thereto. For example, a configuration may also be employed in which the number of settable high-quality image areas is prevented from being exceeded by bundling the divided high-quality image area. 1509 and another high-quality image area 1508 located within a predetermined distance from the divided high-quality image area 1509 into one high-quality image area. For example, in the case of the example in FIG. 15A, the smallest rectangle that includes the high-quality image area 1508 and the high-quality image area 1509 is set as one high-quality image area.

Although, an image formed by arranging four cut images together is used in the fourth embodiment, the same also applies to a panoramic image that is formed by expanding a fish-eye image. In this case, division may occur at the left and right sides of the panoramic image.

Other Embodiments

In the above embodiments, the high-quality image areas are only switched between a valid state and an invalid state, but the present invention is not limited thereto. For example, a configuration may also be employed in which a plurality of image quality levels is provided, and a level can be designated for each area. For example, high image quality, medium image quality, or an invalid state may also be able to be designated for each area. Although the above embodiments describe a configuration in which an area to increase the image quality is designated, an area to reduce the image quality may also be designated. That is to say, a UI that the area processing unit 114 provides to the client 220 need only be one for setting an area in which the image quality is to differ from the image quality in the other area of a fish-eye image or a cut image. As for encoding performed by the imaging processing unit 110, a fish-eye image or a cut image is encoded so that the image quality in an area set through the UI differs from the image quality in the other area.

Although, in the above-described embodiments, a high-quality image area in a cut image is derived from a high-quality image area that is set in a fish-eye image, a high-quality image area in a fish-eye image may also be derived from a high-quality image area that is set in a cut image.

Although preferable embodiments of the present invention have been described above, the present invention is not limited to these embodiments, and various modifications and variations may be made within the scope of the gist of the present invention. For example, although the above embodiments are applied to a fish-eye image and an image obtained by correcting the fish-eye image through geometric conversion processing, any kind of image other than a fish-eye image may be employed as long as correction is required.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120808, filed Jun. 20, 2017 which is hereby incorporated by reference herein in its entirety.

What is claimed is:

1. An image processing apparatus comprising a computer executing instructions that, when executed by the computer, cause the computer to function as:
   an obtaining unit configured to obtain a first image which is captured using a fish-eye lens;
   a generating unit configured to cut out at least a portion of the first image and generate a second image by performing distortion-correction on the at least the portion of the first image;
   a first reception unit configured to receive designation of one or more first areas in which image quality is to be relatively higher than image quality of the other area in the first image;
   a derivation unit configured to derive one or more corresponding areas in the second image corresponding to the one or more first areas designated in the first image; and
   a setting unit configured to selectively perform first setting processing or second setting processing for setting one or more second areas in which image quality is to be relatively higher than image quality of the other area in the second image, based on an upper limit of the number of the one or more second areas which are settable in the second image,
   wherein, a shape of each of the one or more second areas is rectangular,
   wherein, in the first setting processing, the setting unit is configured to set, as the one or more second areas, one or more rectangles each of which circumscribes one of the one or more corresponding areas, and
   wherein, in the second setting processing, the setting unit is configured to set, as the one or more second areas, one or more sets of blocks used in an encoding method for encoding the second image, each block in the one or more sets of blocks overlaps with at least a part of the one or more corresponding areas.

2. The image processing apparatus according to claim 1, wherein the computer further functions as:
   a change unit configured to change the one or more second areas in the second image, in accordance with a user instruction,
   wherein, if a user instruction to change the one or more first areas in the first image that corresponds to the one or more second areas changed by the unit is received, the received user instruction to change the first area is not reflected in the one or more second areas changed by the change unit.

3. The image processing apparatus according to claim 1,
wherein the generating unit cuts out a plurality of portions from the first image to generate a plurality of the second images, and
if the area associated with the function that influences the encoding processing is divided, and the divided areas are located separately in the plurality of second images, the setting unit bundles a smaller one of the divided areas and an area that is located within a predetermined distance from the smaller one of the divided areas into one area.

4. The image processing apparatus according to claim 1, wherein the computer further functions as:
an encoding unit configured to encode the second image so that image quality of the one or more second areas is relatively higher than image quality of the other area in the second image.

5. The image processing apparatus according to claim 4,
wherein the encoding unit is configured to encode the one or more second areas by a quantization step which is smaller than a quantization step for the other area in the second image, so that image quality of the one or more second areas is relatively higher than image quality of the other area in the second image.

6. The image processing apparatus according to claim 1,
wherein, if a size of one of the one or more corresponding areas is smaller than a size of one block of the blocks used in the encoding method for encoding the second image, the setting unit does not set the one of the one or more corresponding areas, as the one or more second areas.

7. The image processing apparatus according to claim 1, further comprising an imaging unit configured to capture the first image.

8. A method for controlling an image processing apparatus, comprising:
obtaining a first image which is captured using a fish-eye lens;
cutting out at least a portion of the first image and generating a second image by performing distortion-correction on the at least the portion of the first image;
receiving designation of one or more first areas in which image quality is to be relatively higher than image quality of the other area in the first image;
deriving one or more corresponding areas in the second image corresponding to the one or more first areas designated in the first image; and
selectively performing first setting processing or second setting processing for setting one or more second areas in which image quality is to be relatively higher than image quality of the other area in the second image, based on an upper limit of the number of the one or more second areas which are settable in the second image,
wherein, a shape of each of the one or more second areas is rectangular,
wherein the first setting processing includes setting, as the one or more second areas, one or more rectangles each of which circumscribes one of the one or more corresponding areas, and
wherein the second setting processing includes setting, as the one or more second areas, one or more sets of blocks used in an encoding method for encoding the second image, each block in the one or more sets of blocks overlaps with at least a part of the one or more corresponding areas.

9. A non-transitory computer-readable medium storing a program for causing a computer to execute a method for controlling an image processing apparatus, the control method comprising:
obtaining a first image which is captured using a fish-eye lens;
cutting out at least a portion of the first image and generating a second image by performing distortion-correction on the at least the portion of the first image;
receiving designation of one or more first areas in which image quality is to be relatively higher than image quality of the other area in the first image;
deriving one or more corresponding areas in the second image corresponding to the one or more first areas designated in the first image; and
selectively performing first setting processing or second setting processing for setting one or more second areas in which image quality is to be relatively higher than image quality of the other area in the second image, based on an upper limit of the number of the one or more second areas which are settable in the second image,
wherein a shape of each of the one or more second areas is rectangular,
wherein the first setting processing includes setting, as the one or more second areas, one or more rectangles each of which circumscribes one of the one or more corresponding areas, and
wherein the second setting processing includes setting, as the one or more second areas, one or more sets of blocks used in an encoding method for encoding the second image, each block in the one or more sets of blocks overlaps with at least a part of the one or more corresponding areas.

10. An image processing apparatus comprising a computer executing instructions that, when executed by the computer, cause the computer to function as:
an obtaining unit configured to obtain a first image which is captured using a fish-eye lens;
a generating unit configured to cut out a plurality of portions of the first image and generate a second image by performing distortion-correction on the plurality of portions of the first image;
a first reception unit configured to receive designation of one or more first areas in which image quality is to be relatively higher than image quality of the other area in the first image;
a derivation unit configured to derive one or more corresponding areas in the second image corresponding to the one or more first areas designated in the first image; and
a setting unit configured to perform setting processing for setting one or more second areas in which image quality is to be relatively higher than image quality of the other area in the second image, based on the one or more corresponding areas,
wherein, in the setting processing, if one of the one or more first areas corresponds to two separated corresponding areas derived by the derivation unit, the setting unit does not set a smaller one of the two separated corresponding areas, as one of the one or more second areas.

11. The image processing apparatus according to claim 10,
wherein, if a size of one of the one or more corresponding areas is smaller than a size of a block used in an encoding method for encoding the second image, the setting unit does not set the one of the one or more corresponding areas, as the one or more second areas.

12. The image processing apparatus according to claim 10, wherein the computer further functions as:
an encoding unit configured to encode the second image so that image quality of the one or more second areas is relatively higher than image quality of the other area in the second image.

13. The image processing apparatus according to claim 12,
wherein the encoding unit is configured to encode the one or more second areas by a quantization step which is smaller than a quantization step for the other area in the second image, so that image quality of the one or more second areas is relatively higher than image quality of the other area in the second image.

14. The image processing apparatus according to claim 10, wherein the computer further functions as:
a change unit configured to change the one or more second areas in the second image, in accordance with a user instruction,
wherein, if a user instruction to change the one or more first areas in the first image that corresponds to the one or more second areas changed by the change unit is received, the received user instruction to change the first area is not reflected in the one or more second areas changed by the change unit.

15. The image processing apparatus according to claim 10, further comprising
an imaging unit configured to capture the first image.

16. A method for controlling an image processing apparatus, comprising:
obtaining a first image which is captured using a fish-eye lens;
cutting out a plurality of portions of the first image and generating a second image by performing distortion-correction on the plurality of portions of the first image;
receiving designation of one or more first areas in which image quality is to be relatively higher than image quality of the other area in the first image;
deriving one or more corresponding areas in the second image corresponding to the one or more first areas designated in the first image; and
performing setting processing for setting one or more second areas in which image quality is to be relatively higher than image quality of the other area in the second image, based on the one or more corresponding areas,
wherein, in the setting processing, if one of the one or more first areas corresponds to two separated corresponding areas derived in the deriving step, a smaller one of the two separated corresponding areas is not set as one of the one or more second areas.

17. A non-transitory computer-readable medium storing a program for causing a computer to execute a method for controlling an image processing apparatus, the control method comprising:
obtaining a first image which is captured using a fish-eye lens;
cutting out a plurality of portions of the first image and generating a second image by performing distortion-corrected on the plurality of portions of the first image;
receiving designation of one or more first areas in which image quality is to be relatively higher than image quality of the other area in the first image;
deriving one or more corresponding areas in the second image corresponding to the one or more first areas designated in the first image; and
performing setting processing for setting one or more second areas in which image quality is to be relatively higher than image quality of the other area in the second image, based on the one or more corresponding areas,
wherein, in the setting processing, if one of the one or more first areas corresponds to two separated corresponding areas derived in the deriving, a smaller one of the two separated corresponding areas is not set as one of the one or more second areas.

* * * * *